United States Patent Office 3,087,949
Patented Apr. 30, 1963

3,087,949
OXIDE ACYLATES AND METAL OXIDE R-OXIDES
OF TETRAVALENT GROUP IV METALS
Jacobus Rinse, 77 Anderson Road, Bernardsville, N.J.
No Drawing. Filed Apr. 4, 1960, Ser. No. 19,490
20 Claims. (Cl. 260—429.3)

This invention relates to new compounds which may be described as regular (or symmetrical) space tetrameric and octameric acyloxy metal oxides and R-oxy metal oxides, the metal being silicon or zirconium or other tetravalent metal and R being a hydrocarbon radical.

The simple metal alkoxides and acylates and their linear polymers described in the literature are to varying degrees unstable, for they unavoidably hydrolyze quickly under ordinary conditions of use. Hence, they are of limited utility or of no practical value where water or moisture is present.

A primary object of the present invention is to provide a new series of metal oxide R-oxides and metal oxide acylates which are so stable or so slow to hydrolyze that they possess new properties rendering them of practical utility in the several fields hereinafter set out.

A specific object is to provide new metal oxide acylates possessing unique surface active properties. Another object is to provide new metal oxide alkoxides having various pharmaceutical uses.

In a most important field, the invention may be considered to relate to new surface active agents of the formulas:

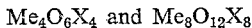

wherein Me is most advantageously either silicon, zirconium or tin but may be any other metal of group IV of the periodic table and X is an acyloxy group.

In another important embodiment, the invention relates to compounds of the formula:

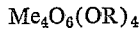

in which the Me is the same as above and the R is a hydrocarbon group of at least 3 carbon atoms.

Repeated runs of the processes herein described coupled with quantitative determinations of yield followed by molecular weight determinations revealed the novel structure of the compounds of the invention. In these runs, the amounts stoichiometrically calculated to produce the new compounds were mixed and reacted, and the yields obtained of the new compounds and of the by-products were substantially the theoretically obtainable amounts. These results coupled with the conformance of the determined molecular weights (using the cryoscopic method) with the theoretical molecular weights evidence the fact that the nucleus of the tetrameric molecules is in the shape of a tetrahedron in which the metal atoms occupy the apexes and are joined along the sides to each other through three oxygen atoms, there being four acyloxy or R-oxy groups attached to the nucleus, one to each metal atom.

The octameric polymers of the invention may be formed simply by aging the tetrameric polymers hereinbefore described, as for twenty-four hours or more. Freshly prepared products revealing a molecular weight indicating there were only four metal atoms to the molecule later revealed doubled molecular weights on subsequent tests made after storage, showing a change to eight metal atoms to the molecule. It has also been ascertained that the octamer or aged products revert to the tetrameric form upon heating to a high temperature, as to 150° C. Related alkylated octameric metal oxide compounds described in the prior art are stated to be hexahedric or cubic in structure and the octameric compounds of the instant invention probably have the same structure rather than that of associated compounds made up of two tetrameric molecules.

The tetrameric compounds of the invention may be generically defined as regular space tetrameric metal oxide acylates and R-oxides of the formula, $Me_4O_6Y_4$, wherein the Me's are the same or different atoms, silicon, zirconium, tin, titanium, hafnium, germanium, cerium, lead, thorium, uranium or a tetravalent rare earth metal; the O's are oxygen; the Y's are the same or different acyloxy groups or hydroxy hydrocarbon groups. The acyloxy compounds may be generically defined as regular space tetrameric and octameric metal oxide acylates of the formula:

$$(Met_4)_n(O_6)_n(X_4)_n$$

wherein Met and O are as defined above, and $n$ is an integer, and all three $n$'s are the same number in any specific compound. The respective tetrameric and octameric classes of compounds may be structurally represented by the following:

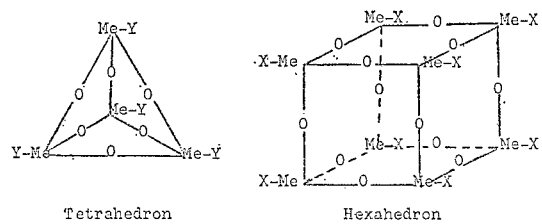

Tetrahedron    Hexahedron the atoms Me, O, Y, and X being defined above.

The oxygen atoms may not be exactly on the sides of the tetrahedron or the hexahedron but may be close to them in a plane with the adjoining metal atoms.

The regular space tetrameric metal oxide alkoxides of the invention can be produced by reacting silicon butoxide or other metal alkoxide of an alcohol volatilizable from the reaction product, with water in substantially the exact mol ratio of 1:1.5. Preferably, the water in solution in a volatile alcohol is slowly introduced into the metal alkoxide, itself in solution in an organic solvent while the latter is being agitated to prevent any local excess of water, and is being heated to a temperature of at least 80° C., the temperature being raised, if not already at such level, to a final level of 100°–200° C. or more, at which the alcohol of the alkoxide is liberated and vaporized off, with the aid of a vacuum if desired, the heating being continued until three mols of alcohol have been liberated per mol of metal employed. The reaction may be represented by the equation:

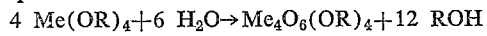

Tetrameric metal oxide R-oxides where R is a hydrocarbon radical of a hydroxy hydrocarbon of too high volatility to permit production by the above described process can be produced by introducing at least one mol of the hydroxy hydrocarbon along with the one and one-half mols of water into the one mol of the metal alkoxide and reacting under the same or substantially the same conditions. Here four mols instead of three mols of alcohol are liberated.

The tetra-metal hexoxyacylates of the invention can be produced from the tetrameric metal oxide alkoxides of volatile alcohols hereinbefore described by adding a monohydric organic acid in the mol proportion of four to one to a solution of the alkoxide and heating at the temperature hereinbefore described, which liberates and vaporizes off four mols of alcohol per mol of the tetrameric metal oxide alkoxide treated.

Preferably, however, the acylates are produced by simultaneously introducing a mixture of the monohydric organic acid and water into the metal alkoxide in the mol proportions of 1:1.5:1, respectively. Again the reactants should be employed in solution form to provide the fluidity required for uniform reaction. Also the heating procedures and temperatures hereinbefore described are employed, the reacting and heating being continued until four mols of alcohol per mol of metal alkoxide used have been liberated and vaporized off. The reaction may be represented by the equation in which the HX is a monohydric organic acid:

$$4Me(OR)_4 + 4HX + 6H_2O \rightarrow Me_4O_6X_4 + 16ROH$$

The polymeric metal oxide acylates can also be produced by the reaction of the tetrachloride of the metal in solution with water and the acid in the mol ratio of 4:6:4 and with an alkyl amine in a quantity which will neutralize the acid, the reaction mass being heated to a temperature at which the polymer and an amine hydrochloride forms, the latter as a precipitate. The solvent is removed by vaporization, leaving the polymer.

The metal alkoxides used in the production of the compounds of the instant invention are preferably derived from lower molecular alcohols. The alcohols must be of sufficiently high volatility that when their radicals are liberated in the process by reaction of the alkoxides with water or with water and acid, they may be removed by distillation. Alcohols of suitable volatility are propanol, butanol and pentanol and the corresponding iso-alcohols and secondary alcohols. Alkoxides of higher molecular alcohols or of mixtures of high and lower alcohols can be employed under some conditions, the alkoxides of higher alcohols having up to 10 carbon atoms being operable. In actual practice, alkoxides of iso-propanol and butanol have the advantages of low cost and low boiling point.

For producing the tetra-metal hex-oxy R-oxides from the above mentioned alkoxides, any hydroxy hydrocarbon of a higher boiling point than the alcohol corresponding to the alkoxide used can be employed. In addition to the aliphatic alcohols hereinbefore specifically referred to, there may be mentioned the aromatic hydroxides as phenol, the cresols and other alkylated phenols of 1–18 carbon atoms in the side chain and phenols substituted with functional groups inactive in the process. There also may be mentioned high molecular aliphatic alcohols including those having up to 20 carbon atoms or more and they may be cyclic or straight chained, primary or secondary, unsubstituted or substituted with atoms or radicals inactive in the process, examples being lauryl, cetyl, stearyl, oleyl, linoleyl, ethyl, hexyl and cyclohexyl alcohols.

The organic monobasic acids suitable for the process herein involved may be of any type. In a preferred embodiment they are aliphatic carboxylic acids, either saturated or unsaturated, aromatic, cycloaliphatic or heterocyclic acids or as well ester acids (half esters of dicarboxylic acids) and substituted acids where the substituent group is not active in the process, such as hydroxy acids and amino acids. The preferred class is the fatty acid group, from formic acid up through the long chain fatty acids such as stearic acid, oleic acid and behenic acid. Other operable acids include the various acids or acid mixtures of tall oil or other industrial or natural sources. Instead of a single acid, mixtures of two or more acids can be employed.

In accordance with another embodiment of the invention the novel acylate compounds are those derived from sulfonic acids. The preferred source is aromatic sulfonic acids or alkyl aryl sulfonic acids such as dodecyl benzene sulfonic acid. The aryl radical may have more than one substituent group as in xylene sulfonic acids, and the group or groups may have from one to twenty-two or more carbon atoms.

Other acids or acid-acting compounds include the monoalkyl sulfonates (sulfates), of either saturated or unsaturated character, as sulfated fatty alcohols, sulfated monoethanol amines and amide sulfates, of 2 to 22 carbons in the hydrocarbon chain. Another type of acid suitable for the process is the partial ester of acids of phosphorous, more particularly, the monobasic esters, as the alkyl phosphoric acids of 16 or more carbon atoms, and specifically the palmityl and stearyl compounds and as well the dialkyl hydrogen phosphates.

The reaction is carried out in the presence of an organic solvent or a mutual solvent for the reactants. The solvent serves to provide the required fluidity of the reactants, to moderate the speed of the reaction, to provide the desired uniformity of reaction and assist in the prevention of the formation of undesired products. Aromatic hydrocarbons such as toluene and xylene can be employed and they are preferably used in conjunction with lower molecular alcohols. Where the products are to be produced in segregated or powdered condition, it is necessary that the hydrocarbon as well as the lower molecular alcohol solvent be of sufficiently high volatility as will permit vaporization from the reaction mass.

The compounds of the present invention possess properties substantially different from the simple metal alkoxide and acylate compound described in the literature. They have a considerably lower speed of hydrolysis and some of them do not hydrolyze at all under ordinary conditions of storage or use. The tetra-titanium hex-oxy tetra-stearate is so stable it can be emulsified in water and the water can be removed by boiling without causing hydrolysis.

The acylates have surface-active properties rendering them of general use as dispersing agents, emulsifiers, and as detergents. Some of the compounds are also useful for water-proofing and as driers for paints. Several of the alkoxide compounds, and particularly the zirconium oxide alkoxide compounds, are useful for the treatment of athlete's foot and for the treatment of poison ivy. They hydrolyze slower than the mono metal alkoxides and can be used for the preparation of very pure and fine-particle size metal hydroxides and polymeric metal oxide hydroxides which possess catalytic activity.

*Example 1*

Two hundred and eighty grams of stearic acid and 27 g. of water were dissolved in 100 g. of isopropyl alcohol and added to a solution of 327 g. of zirconium isopropoxide in 100 g. of xylene while the latter was being heated to 80° C. and agitated. The reaction was continued while raising the temperature finally to 220° C. under reduced pressure. The liberated isopropyl alcohol and that added as a solvent and as well the xylene was distilled off. The product obtained was a wax-like material having a melting point of 250° C. and a molecular weight of 1620 (calculated M.W. 1580). The yield was 385 g. The product was soluble in hexane and was found to possess excellent water-proofing properties for textiles.

*Example 2*

Three hundred and eighty-three grams of zirconium normal butoxide was dissolved in 200 g. of hexane. Twenty-seven grams of water dissolved in 5 ml. of isopropyl alcohol was slowly added at 80° C. during vigorous agitation. The reaction was continued at 120° C. until no more butyl alcohol vaporized off. The product obtained was tetra-zirconium hex-oxy tetra-butoxide. Yield 187 grams.

In the foregoing process, the zirconium normal butoxide may be replaced by equivalent amounts of titanium or tin alkoxides of other lower molecular alcohols, and corresponding products are obtained.

*Example 3*

Sixty grams of acetic acid and 27 g. of water after being dispersed in 100 g. of isopropyl alcohol were slowly added during agitation to 327 g. of zirconium isopropoxide dissolved in 100 g. of toluene, the reaction mass being heated to 100° C. When isopropyl alcohols ceased to vaporize off, the reaction was complete, the yield being 177 g. of a white powder soluble in benzene. Its calculated zirconium content was 51.4%. The product was of the formula $Zr_4O_6(OOCCH_3)_4$. The theoretical zirconium content is 52.3%.

*Example 4*

Twenty-seven g. of water dissolved in 200 g. of isopropyl alcohol were added to 411 g. of tin tetra-butoxide theretofore dissolved in 200 g. of toluene. The mass was reacted at a temperature of 110° C. until the solvents and butyl alcohol liberated in the process ceased to vaporize off. Thereupon 280 g. of stearic acid was added and the temperature was raised to 190° C. and continued until the reaction was completed. The actual yield was 418 g. (calculated 422 g.) and the product was a wax having a molecular weight of 2030. (Calculated weight, 1688.)

In this process, equivalent quantities of the zirconium butoxide or the titanium butoxide can be substituted for the tin compound employed.

*Example 5*

Twenty-seven grams of water and 120 ml. of mixed alcohols, mostly primary amyl alcohol, together with 60 ml. of isopropyl alcohol were added to 208 g. of ethyl silicate, $Si(OC_2H_5)_4$, followed by the addition of 0.5 ml. of hydrogen chloride. The resulting mixture was refluxed for four hours after which the reaction was continued until the temperature reached 100° C., the volatile products being permitted to vaporize off. Thereupon the reaction mass was heated under reflux for another 1.5 hours and thereupon the mass was heated at 160° C. under vacuum until the alcohol ceased to come off. The yield of the product was 137.5 g. (calculated 139 g.). It was a clear viscous liquid soluble in hydrocarbons and in alkyd resin solutions. The silicone content of the product was 19.9% which compares with the calculated silicone content of 20.1% contained in $Si_4O_6(OC_5H_{11})_4$. In this process, the amyl alcohol mixture can be replaced by equivalent amounts of phenol or of cyclohexanol.

*Example 6*

Twenty-seven g. of water and 280 g. of stearic acid in 360 cc. isopropanol were added to 284 g. of titanium isopropoxide dissolved in isopropyl alcohol, the mass being heated at 90° C. initially and finally at 170° C. until all the solvent present and the liberated alcohol was distilled off. The yield obtained was 354 g. of a wax-like solid soluble in hydrocarbon having a molecular weight of 1300. (Calculated weight, 1404.) After three days in storage, a new determination indicated a molecular weight of 2450. (Calc. for octamer; 2788 M.W.) Immediately thereafter, the temperature of the product in the naphthalene solution was raised to 150° C. After 30 minutes it was cooled to 80° C. and a new determination was made revealing a molecular weight of 1270 indicating reversion to the tetramer. After twenty-four hours another test revealed a molecular weight of 2500, indicating the octamer.

In the foregoing process the stearic acid can be replaced with equivalent amounts of other acids such as oleic, lauric, palmitic, benzoic and hexahydrobenzoic acids.

*Example 7*

Three hundred and sixteen grams of dodecyl benzene sulfonic acid and 27 g. of water in admixture with 100 g. of isopropyl alcohol were added to 284 g. of titanium isopropoxide previously dissolved in 100 g. of isopropyl alcohol. The mass was heated until the temperature reached 120° C. whereupon 100 g. of mineral oil (100 SUS) was added and the temperature raised to 150° C., vacuum being applied for a while to remove isopropyl alcohol. Thereupon 5 g. of water dissolved in 50 g. of isopropyl alcohol was added and the mass was again heated to 150° C. until no more alcohol vaporized off. The yield was 490 g. (calculated 488 g.) of $$Ti_4O_6(C_{18}H_{29}O_3S)_4$$

This product was resin-like and was soluble in mineral oil and revealed properties of a lubricating oil detergent. It lowers surface tension and brings about emulsification of water in oil.

*Example 8*

Nineteen g. of titanium tetrachloride are mixed with 100 g. of hexane. Then a solution of 28 g. of stearic acid and 10.1 g. of triethylamine in 50 g. of hexane is added slowly. Next a mixture of 22.2 g. of butanol with 30.3 g. of triethylamine is added slowly. The temperature is raised to 60° C. and the precipitate of triethylamine hydrochloride is filtered off. Then 2.7 g. of water mixed with 25 g. of isopropanol are added. Two hundred g. of toluene are added and hexane is removed by distillation. The temperature is raised to 150° C. and the toluene is removed, finally under vacuum. The yield is 34 g. of tetrameric titanium oxide stearate, a wax-like material (M.P. 40° C.) of great stability and with a molecular weight of 1300 determined by lowering of the freezing point of naphthalene.

After this product has been stored overnight, its molecular weight was ascertained as having about doubled (2450) indicating that the octamer had formed.

*Example 9*

The same procedure is followed as in Example 8 but stearic acid and 22.2 g. butanol are replaced by 30 g. of butanol, added together with 40.4 g. of triethylamine in 50 g. of hexane. The yield is 13.5 g. of a compound with the composition $[(C_4H_9O)_4Ti_4O_6]_n$. Its ash content is 55% (calculated 55.2%). The molecular weight determinations indicated association, the weight being between 1000 and 2000. The product is soluble in hydrocarbons and it reacts with stearic acid, yielding a compound practically identical with the product from Example 8, except for a small content of butyl stearate.

With further reference to the structure of the tetrameric products of the present invention, the atoms of the $Me_4O_6$ group apparently are in the form of a tetrahedron having the metal atoms at the corners and the oxygen atoms along or near the centers of the sides. Each metal atom of the metal alkoxide initially used has given up one electron to each of 3 oxygen atoms. By this exchange the center of the tetrahedron, consisting of 6 oxygen atoms, obtains a negative charge which is opposed by the positive charge of the metal atoms. The one remaining electron of each metal atom remains combined with either of the ligands, an alkoxy group or an acyloxy group, thereby providing molecules of unique stability.

I claim:

1. Space polymers of the formula $$Me_4O_6Y_4$$

wherein Me is a metal of group 4 of the periodic table having a valence of 4, Y is a negative radical selected from the group consisting of $$R_1-O-, \quad R_2\overset{O}{\underset{\|}{C}}-O-, \quad R_3\overset{O}{\underset{\underset{O}{\|}}{\overset{\|}{S}}}-O- \quad \text{and} \quad R_4-O-\overset{O}{\underset{\underset{O}{\|}}{\overset{\|}{S}}}-O-$$

in which the "R's" are hydrocarbon radicals selected from the group consisting of aliphatic hydrocarbon radicals of 2–18 carbon atoms, a hexahydrophenyl radical, a phenyl radical and a phenyl radical substituted by an aliphatic hydrocarbon radical of 2–18 carbon atoms and one and only one of said negative radicals is attached to each metal atom.

2. Space polymers of the formula $$Zr_4O_6Y_4$$

wherein Zr is zirconium with a valence of 4 and Y is $$\text{R}\overset{\text{O}}{\underset{\|}{\text{C}}}\text{—O—}$$

and R is an aliphatic hydrocarbon radical of 2–18 carbon atoms, one and only one Y being attached to each Zr atom.

3. Space polymers of the formula $$Zr_4O_6Y_4$$

wherein Zr is zirconium with a valence of 4 and Y is R—O— and R is an hydrocarbon radical of 2–18 carbon atoms, one and only one Y being attached to each Zr atom.

4. Space polymers of the formula $$Sn_4O_6Y_4$$

wherein Sn is tin with a valence of 4 and Y is $$\text{R}\overset{\text{O}}{\underset{\|}{\text{C}}}\text{—O—}$$

and R is an aliphatic hydrocarbon radical of 2–18 carbon atoms, one and only one Y being attached to each Sn atom.

5. Space polymers of the formula $$Ti_4O_6Y_4$$

wherein Ti is titanium with a valence of 4 and Y is $$\text{R}\overset{\text{O}}{\underset{\|}{\text{C}}}\text{—O—}$$

and R is a hydrocarbon radical of 2–18 carbon atoms, one and only one Y being attached to each Ti atom.

6. Space polymers of the formula $$Ti_4O_6Y_4$$

wherein Ti is titanium with a valence of 4 and Y is R—O— and R is a hydrocarbon radical of 2–18 carbon atoms, one and only one Y being attached to each Ti atom.

7. Space polymers of the formula $$Me_4O_6Y_4$$

wherein Me is a metal of group 4 of the periodic table having a valence of 4 and Y is an alkylbenzyl sulfonate containing 1–12 carbon atoms in the alkyl radical, one and only one Y being attached to each metal atom.

8. Space polymers of the formula $$Me_4O_6Y_4$$

wherein Me is a metal of group 4 of the periodic table having a valence of 4, Y is $$\text{R}\overset{\text{O}}{\underset{\|}{\text{C}}}\text{—O—}$$

and R is an aliphatic hydrocarbon radical of 2–18 carbon atoms, one and only one Y being attached to each metal atom.

9. Space polymers of the formula $$Me_4O_6Y_4$$

wherein Me is a metal of group 4 of the periodic table having a valence of 4, Y is R—O— and R is an alkyl radical of 3–5 carbon atoms, one and only one Y being attached to each metal atom.

10. A space polymer of the formula $$Zr_4O_6Y_4$$

wherein Zr is zirconium with a valence of 4 and Y is the acyloxy radical of stearic acid, one and only one Y being attached to each Zr atom.

11. A space polymer of the formula $$Sn_4O_6Y_4$$

wherein Sn is tin with a valence of 4 and Y is the acyloxy radical of stearic acid, one and only one Y being attached to each Sn atom.

12. A space polymer of the formula $$Ti_4O_6Y_4$$

wherein Ti is titanium with a valence of 4 and Y is the acyloxy radical of stearic acid, one and only one Y being attached to each Ti atom.

13. A space polymer of the formula $$Ti_4O_6Y_4$$

wherein Ti is titanium with a valence of 4 and Y is the acyloxy radical of oleic acid, one and only one Y being attached to each Ti atom.

14. A space polymer of the formula $$Ti_4O_6Y_4$$

wherein Ti is titanium with a valence of 4 and Y is the acyloxy radical of benzoic acid, one and only one Y being attached to each Ti atom.

15. A space polymer of the formula $$Ti_4O_6Y_4$$

wherein Ti is titanium with a valence of 4 and Y is the acyloxy radical of hexahydrobenzoic acid, one and only one Y being attached to each Ti atom.

16. A space polymer of the formula $$Ti_4O_6Y_4$$

wherein Ti is titanium with a valence of 4 and Y is the acyloxy radical of lauric acid, one and only one Y being attached to each Ti atom.

17. A space polymer of the formula $$Zr_4O_6Y_4$$

wherein Zr is zirconium with a valence of 4 and Y is the alkoxy radical of butanol, one and only one Y being attached to each Zr atom.

18. A space polymer of the formula $$Zr_4O_6Y_4$$

wherein Zr is zirconium with a valence of 4 and Y is the acyloxy radical of acetic acid, one and only one Y being attached to each Zr atom.

19. Tetra-metal, hex-oxy, tetra-(dodecyl-benzene sulfonate) wherein the metal has a valence of 4 and is of group IV of the periodic table.

20. Tetra-titanium, hex-oxy, tetra-dodecyl benzene sulfonate wherein titanium has a valence of 4.

References Cited in the file of this patent

UNITED STATES PATENTS 2,980,633    Koehler et al. _____ Apr. 18, 1961

FOREIGN PATENTS 621,742    Great Britain _____ Apr. 19, 1949
733,224    Great Britain _____ July 6, 1955

OTHER REFERENCES

Bradley et al.: Journal of the Chemical Society (London), March 1955, pp. 721–726.

"Hackh's Chemical Dictionary," the third edition, McGraw-Hill, 1944, p. 18 relied on.

Bradley: "Metal-Organic Compounds," Advances in Chemistry Series No. 23, 1959, published by the American Chemistry Society, pp. 10–36 relied on.